US009790075B2

(12) United States Patent
Menolotto et al.

(10) Patent No.: US 9,790,075 B2
(45) Date of Patent: Oct. 17, 2017

(54) TAP GROUP

(71) Applicant: Huber S.p.A., San Maurizio d'Opaglio, Novara (IT)

(72) Inventors: Cristian Menolotto, San Maurizio d'Opaglio (IT); Roman Kalousek, San Maurizio d'Opaglio (IT)

(73) Assignee: Huber Cisal Industrie S.p.A., San Maurizio d'Opaglio (IT)

( * ) Notice: Subject to any disclaimer, the term of this patent is extended or adjusted under 35 U.S.C. 154(b) by 0 days.

(21) Appl. No.: 14/491,832

(22) Filed: Sep. 19, 2014

(65) Prior Publication Data
US 2015/0083253 A1 Mar. 26, 2015

(30) Foreign Application Priority Data
Sep. 20, 2013 (IT) .............. PD2013A0258

(51) Int. Cl.
*B67D 1/00* (2006.01)
*B65D 47/24* (2006.01)
(Continued)

(52) U.S. Cl.
CPC ......... *B67D 1/0082* (2013.01); *B65D 47/248* (2013.01); *B67D 1/0855* (2013.01); *B67D 7/22* (2013.01); *F16K 19/006* (2013.01); *F16K 31/60* (2013.01); *F16K 37/0008* (2013.01); *F16K 37/0016* (2013.01); *B67D 2001/0095* (2013.01); *Y10T 137/87249* (2015.04)

(58) Field of Classification Search
CPC .. B67D 1/0082; B67D 1/0855; B65D 47/248; F16K 37/0008; F16K 37/0016; F16K 31/60; Y10T 137/87249

USPC ............................... 137/801; 251/248, 250.5
See application file for complete search history.

(56) References Cited

U.S. PATENT DOCUMENTS 3,142,995 A * 8/1964 Forrest ................ F16K 37/0016
116/248
4,290,553 A * 9/1981 Molgaard ............ G05D 23/023
236/42
(Continued)

FOREIGN PATENT DOCUMENTS

DE 198 22 364 A1 12/1999
DE 10 2006 009 665 A1 4/2007
(Continued)

*Primary Examiner* — Mary McManmon
*Assistant Examiner* — Patrick Williams
(74) *Attorney, Agent, or Firm* — Blank Rome LLP

(57) ABSTRACT

A tap group comprising a tap body provided with at least one dispensing exit, an operating lever or knob, a regulation member of the parameters of the flow of water to be dispensed (the parameters including the temperature and/or the flow of water and/or the direction of the flow), and a transmission including gears which operatively connect the operating lever or knob to said regulation member of the flow of water. Advantageously, the gears create a gear ratio between the operating lever or knob and a control rod of the regulation member of the parameters of the flow of water, so as to reduce the rotation of the control rod of the regulation member for the same rotation of the operating lever or knob. The tap group also includes a ring-nut provided with at least one indicator and/or a reference index of the parameters of the flow to be dispensed.

14 Claims, 7 Drawing Sheets

(51) Int. Cl.
  *B67D 1/08* (2006.01)
  *B67D 7/22* (2010.01)
  *F16K 31/60* (2006.01)
  *F16K 37/00* (2006.01)
  *F16K 11/00* (2006.01)

(56) References Cited

U.S. PATENT DOCUMENTS

| | | | | |
|---|---|---|---|---|
| 5,342,025 A | * | 8/1994 | Hwang | F16K 3/085 137/556 |
| 6,009,900 A | * | 1/2000 | Elgert | F17C 13/04 137/505 |
| 6,135,147 A | * | 10/2000 | Peters | F16K 37/0008 137/552 |
| 6,820,647 B1 | * | 11/2004 | Grecco | F16K 31/041 137/137 |
| 6,935,368 B1 | | 8/2005 | Lee | |
| 2009/0242055 A1 | | 10/2009 | Yang | |
| 2009/0260696 A1 | * | 10/2009 | Cruickshank | F16K 27/0263 137/468 |
| 2009/0314360 A1 | | 12/2009 | Checiches et al. | |
| 2012/0241654 A1 | * | 9/2012 | Clifford | F16K 31/60 251/96 |
| 2012/0319019 A1 | * | 12/2012 | Burgess | F16K 31/53 251/129.11 |

FOREIGN PATENT DOCUMENTS

| | | |
|---|---|---|
| EP | 1 522 777 A1 | 4/2005 |
| JP | 8-75037 A | 3/1996 |

\* cited by examiner

TAP GROUP

BACKGROUND OF THE INVENTION

1. Field of the Invention

The present invention relates to a tap group and in particular to a tap group provided with at least one control knob for adjusting the parameters of the flow of water to be dispensed, i.e. temperature and/or flow rate and/or the direction of flow.

2. Description of the Related Art

As is known, tap groups comprise a tap body which accommodates at least one member for regulating the parameters of the flow of water to be dispensed, and which is provided with at least one control lever or knob for said member.

In the groups of the prior art often the user is not able to regulate in a precise manner the parameters of the flow of water to be dispensed, since the actuation of the control knob is often too sensitive, or in other cases not very sensitive, and thus the parameters of the flow are modified too abruptly or too slowly, respectively.

This poor adjustment sensitivity can lead to wrong adjustments of temperature, with the risk of burns and/or wrong settings of the flow rate with the risk, for example, of annoying squirts in the adjacent sink or in the surrounding environment.

SUMMARY OF THE INVENTION

In order to solve the problems mentioned above, to date some solutions have been adopted in the art.

For example, it is known to provide the operating knob or lever with indicators or indexes of the parameter to be modified, such as temperature, flow or flow direction indicators, in order to guide the user to the proper operation of the knob itself.

It is also known to arrange, between the knob and the regulation member, reduction means that avoid direct transmission, i.e. 1:1, between the control knob or lever and the regulation member.

However, such prior art solutions have some drawbacks.

In fact, if on the one hand the modification of the direct transmission prevents, for example, excessively abrupt variations of the parameters of the flow, on the other hand the user never has the exact perception of the changes in the flow parameters imposed in real time as a result of the rotation of the knob or lever.

Furthermore, the user often, by grasping the knob or lever, accidentally ends up with covering, at least partially, the indicators for regulating the parameters of the flow, and in this way he/she again does not have the exact perception of the variations imposed in real time with the actuation of the control knob or lever.

It follows that the user, especially at the first operations, is never able to regulate the flow according to the preferred parameters.

The need of solving the drawbacks and limitations mentioned with reference to the prior art is therefore felt.

Such a need is met by a tap group according to the claims.

BRIEF DESCRIPTION OF THE DRAWINGS

Further features and the advantages of the present invention will appear more clearly from the following description of preferred non-limiting embodiments thereof, in which.

Elements or parts of elements in common between the embodiments described below are referred to with the same reference numerals.

DETAILED DESCRIPTION OF THE INVENTION

Figure 1A:
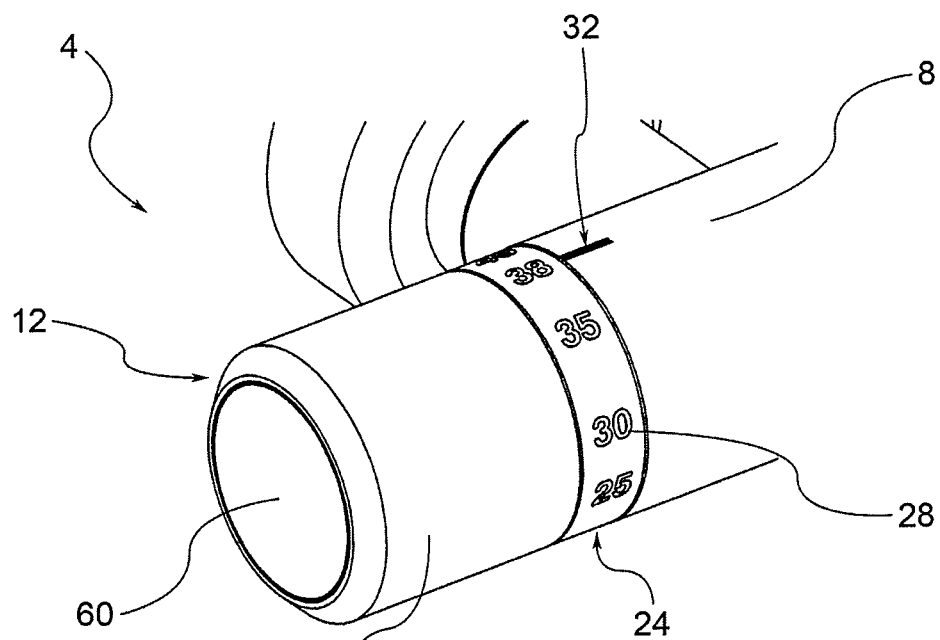
FIGS. 1a-1b are partial perspective views of a tap group according to embodiments of the present invention.

With reference to the above figures, reference numeral globally indicates an overall schematic view of a tap group according to the present invention.

The tap group 4 comprises a tap body 8 having at least one dispensing exit (not shown).

For the purposes of the present invention the shape, size and materials of the tap group can be any; also the type and size of the dispensing exit is not binding. The dispensing exit can be integral with the tap body 8, both can be separated from the tap body 8 and fluidically connected thereto by means of adduction channels, a hose and the like.

The tap group 4 comprises an operating knob or lever 12, which can have any shape and size; said operating knob or lever can be in a single piece, such as cylindrical and can be provided with an appendix or lever to facilitate the gripping and handling by a user.

The tap group 4 comprises a regulation member 16 of the flow parameters of water to dispense, said parameters comprising the temperature and/or the flow of water and/or the direction of the flow. In particular, the regulation members 16 that change the direction of the flow to be dispensed are commonly called deviators and have the function, for example, to convey the flow of water to different dispensing exits, such as for example a dispensing mouth and a shower.

For example, the regulation member 16 of the parameters of the flow includes a mixer cartridge, adapted to regulate the flow rate and/or the temperature by mixing together two flows of water at different temperatures.

According to a possible embodiment, said mixer cartridge is a thermostatic type cartridge.

It is also possible to use, as regulation member 16, a flow rate regulator, commonly called screw-down shut off.

The regulation member 16, whatever the type, is commonly provided with a control rod 52. The control rod 52 usually comprises a connecting end, provided for example with a grooved or ribbed profile to facilitate the mechanical connection thereof, for example to a knob or lever or other device adapted to mechanically mate with the same control rod 52 in order to move it in rotation. Said control rod 52 is operatively connected to the internal devices and/or mechanisms of the regulation member adapted to carry out the function of regulation of the flow parameters, such as flow and/or temperature and/or direction of flow, in a known manner.

The tap group 4 further comprises transmission means 20 which operatively connect the operating lever or knob 12 to said regulation member of the flow of water.

The transmission means 20 create a gear ratio between the operating knob or lever 12 and the control rod 52 of the regulation member 16 of the flow of water, so as to reduce the rotation of the control rod 52 of the regulation member 16 for the same rotation of the operating lever or knob 12: in other words, the gear ratio reduces the rotation sensitivity of the control rod 52 of the regulation member 16 under the operation of the operating lever or knob 12.

Advantageously, the tap group 4 comprises a ring-nut provided with at least one indicator 28 and/or a reference index 32 of the parameters of the flow to be dispensed, such as temperature and/or flow rate, wherein the ring-nut 24 is separate from the operating knob or lever 12 and is arranged on the tap group 4 so as to be visible to the user.

The ring-nut 24 may be arranged in any position with respect to the operating knob or lever 12 and with respect to the tap body 8; for example, the ring-nut 24 may be positioned in a position adjacent to the operating knob or lever 12, or it may be arranged in a remote position with respect to the same operating lever or knob 12.

According to a possible embodiment (FIGS. 3a, 3b, 4a, 4b), the ring-nut 24 is at least partially embedded in the tap body 8, wherein said tap body 8 comprises at least one window 26 so as to make a portion of said ring-nut 24 at least partially visible.

In addition, the ring-nut 24 is integral with the control rod 52 of the regulation member 16 in order to display in real time the change of the flow parameters set by the user in response to the operation of the operating lever or knob 12.

Figure 2A:
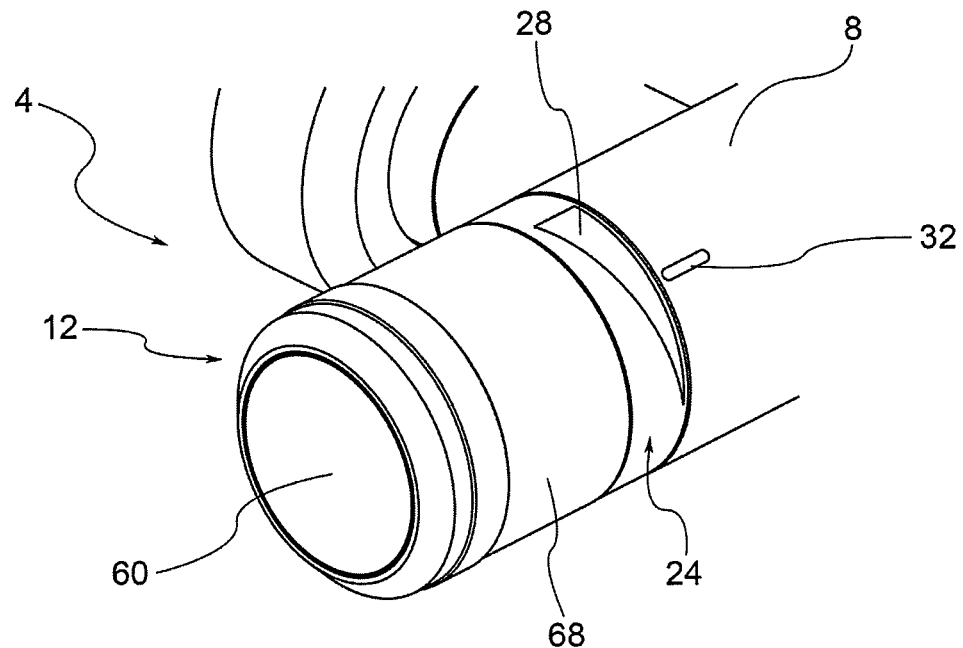
FIGS. 2a-2b are partial perspective views of a tap group according to further embodiments of the present invention.

According to a possible embodiment (FIGS. 1a, 2a), the ring-nut 24 is a body provided with indicators 28 of the parameters of the flow to be dispensed, and a corresponding reference index 32 for said parameters is placed on the tap body 8.

Indicators 28 may include numeric values to indicate the predetermined temperature, but also graphic symbols that display the temperature and/or flow rate to be set.

The reference index 32 is for example represented by a graphic symbol such as an arrow, a dot, a line, and the like.

Figure 1B:
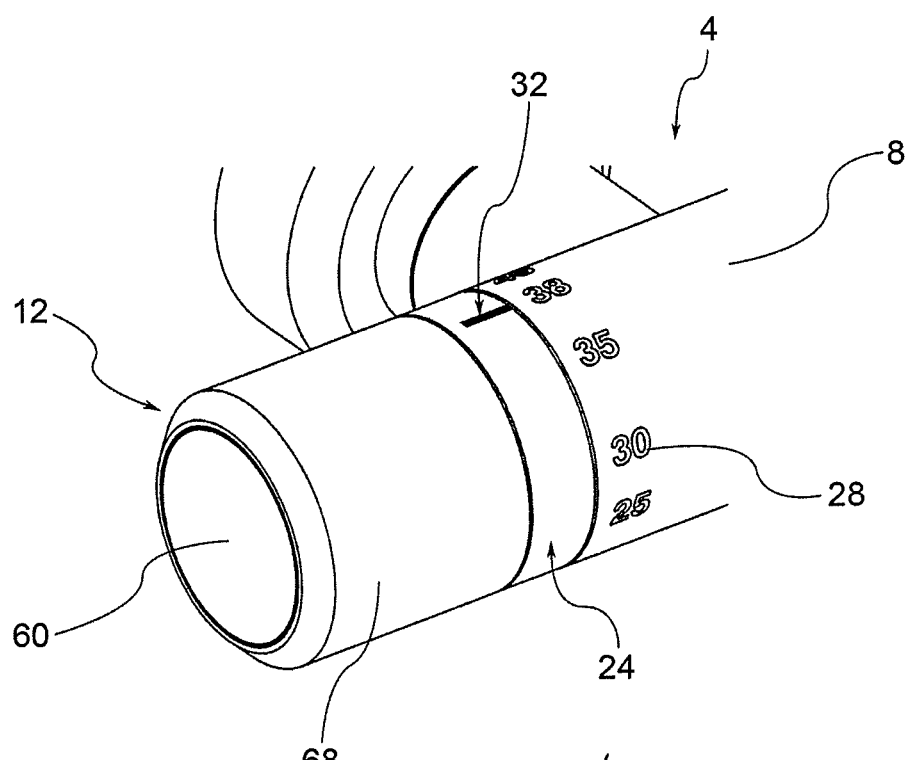
Figure 2B:
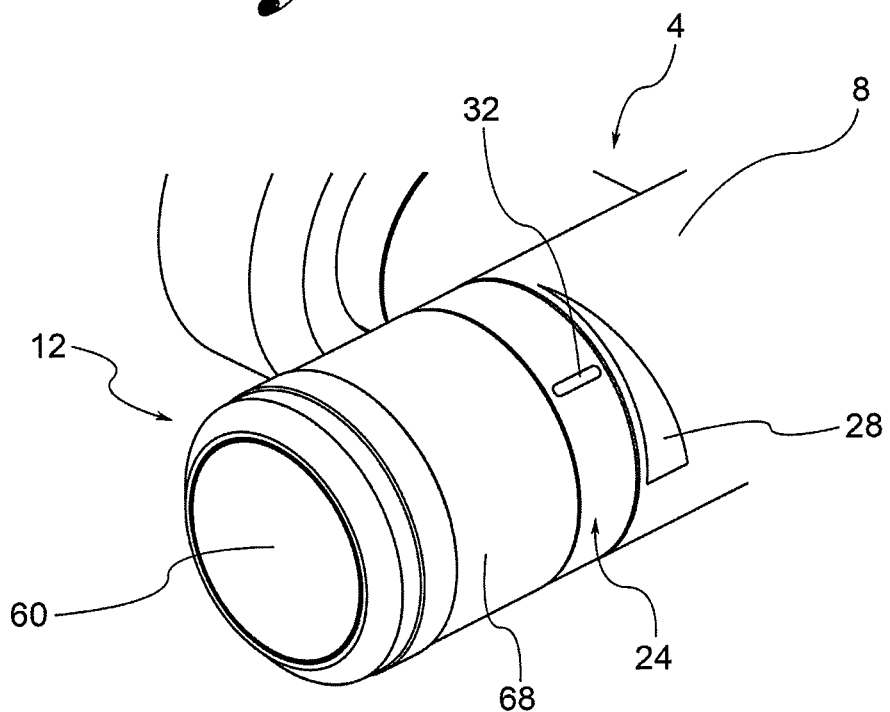
Figure 3A:
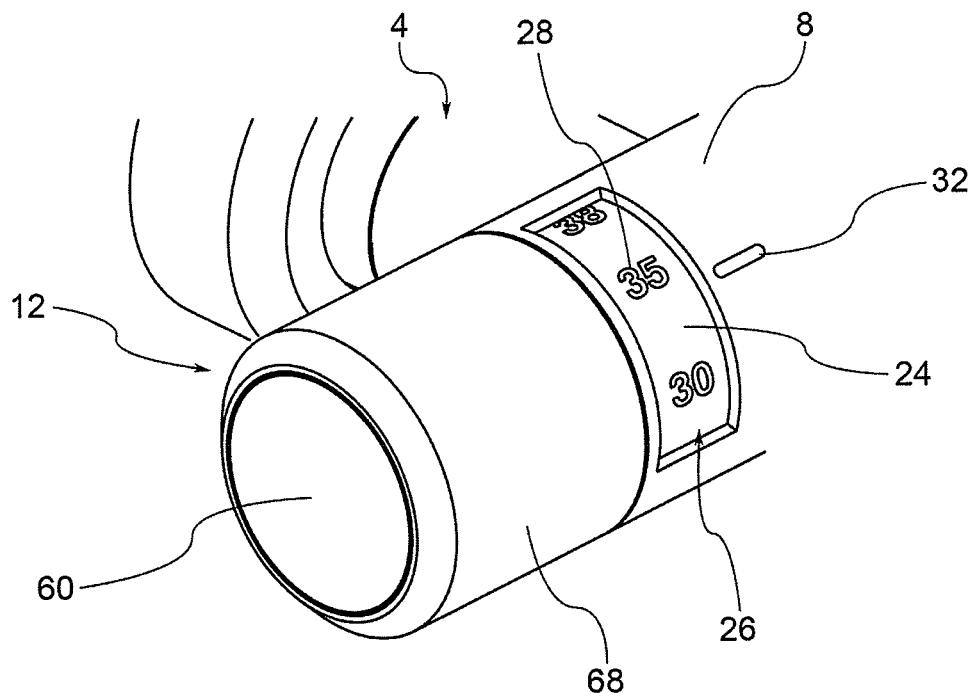
FIGS. 3a-3b are partial perspective views of a tap group according to further embodiments of the present invention.
Figure 3B:
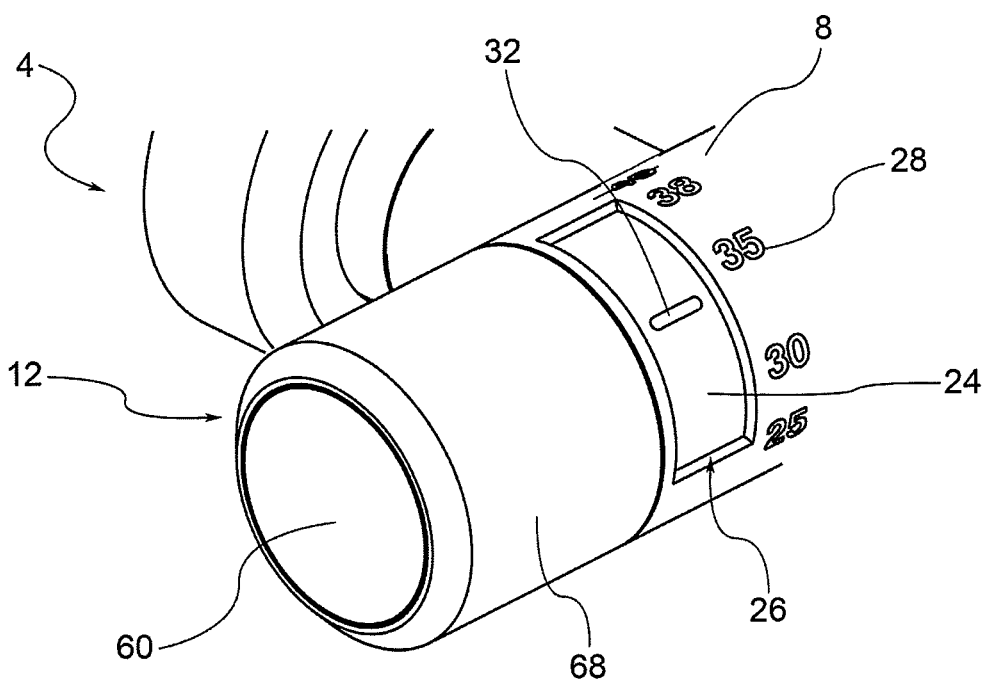
Figure 4A:
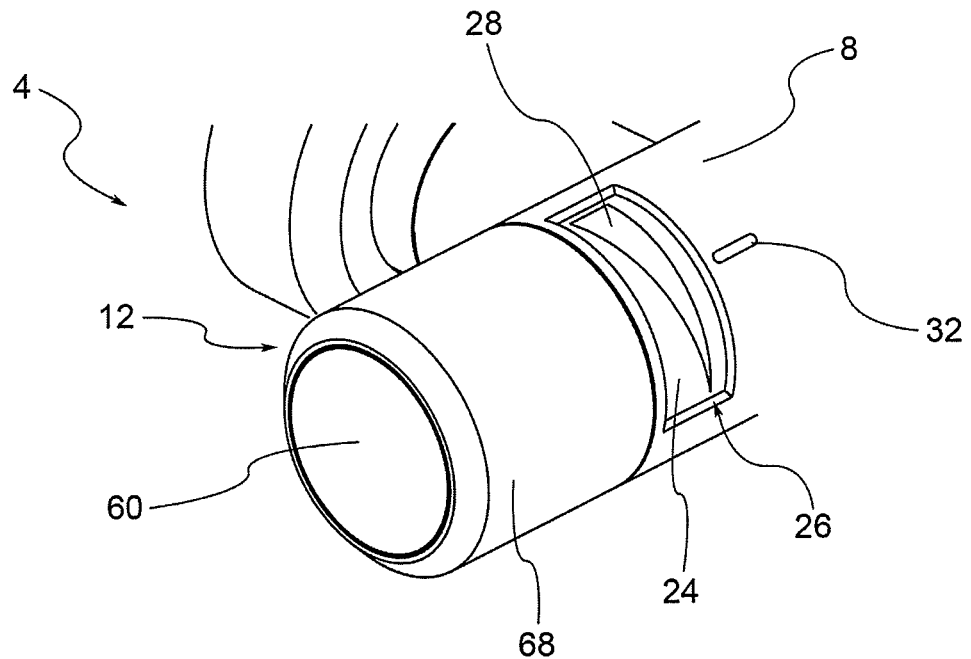
FIGS. 4a-4b are partial perspective views of a tap group according to further embodiments of the present invention.
Figure 4B:
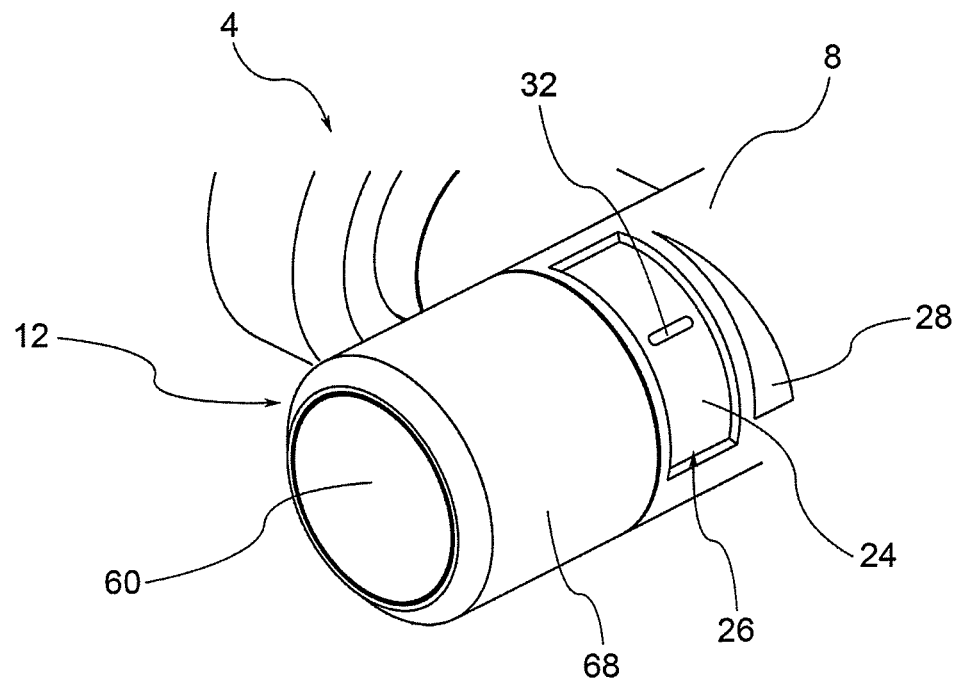
Figure 5:
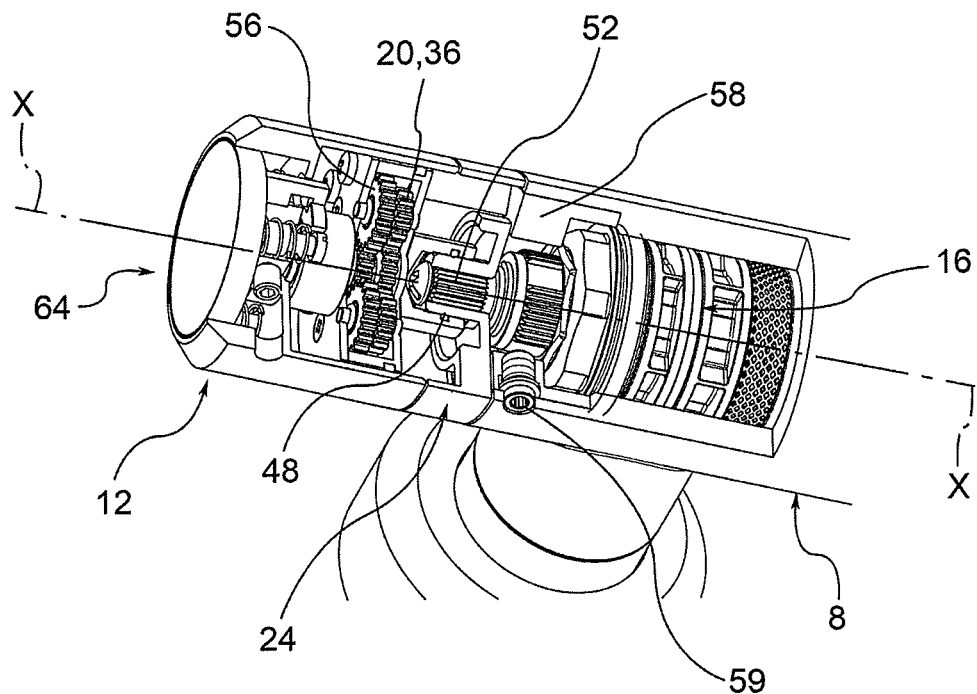
FIGS. 5-6 are perspective sectional views, from different angles, of a tap group according to the present invention.
Figure 6:
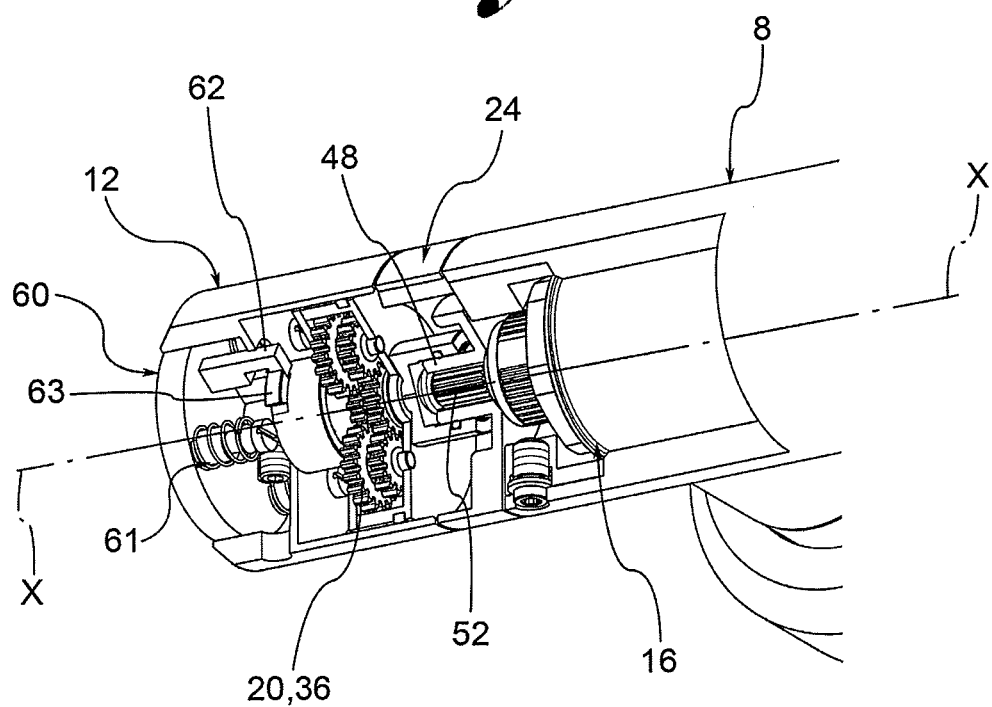
Figure 7:
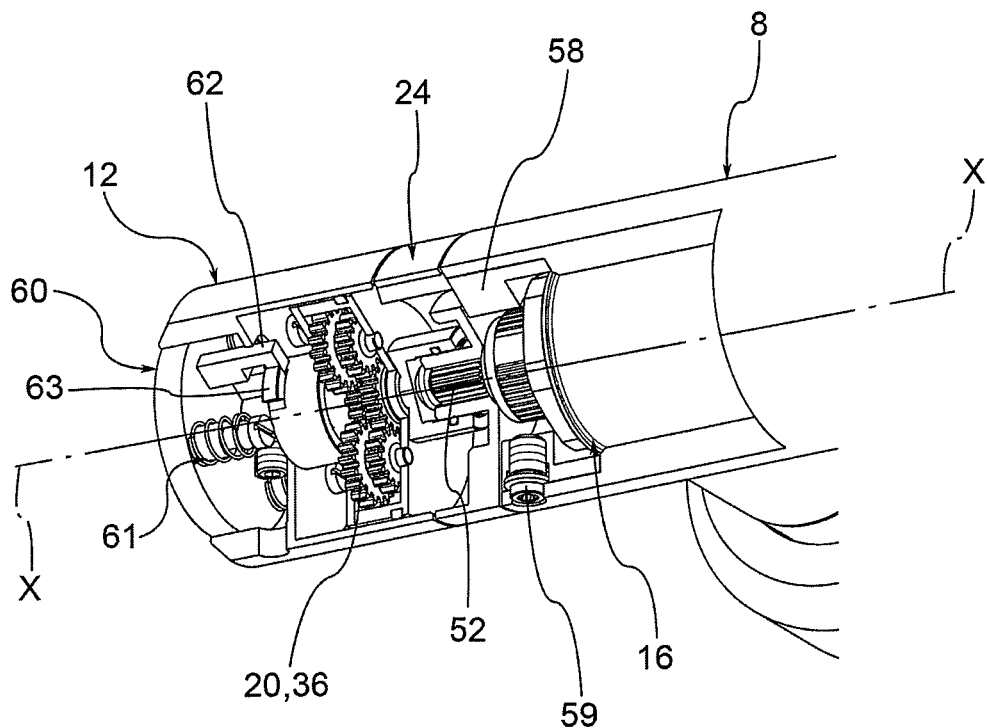
FIG. 7 is a perspective partly sectional view of a tap group according to a further embodiment of the present invention.
Figure 8:
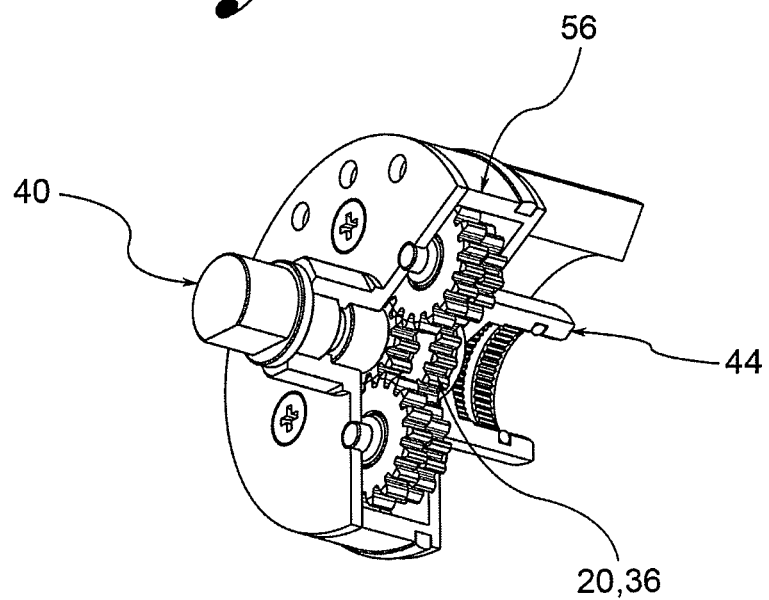
FIGS. 8-9 are perspective views, from different angles, of some internal components of a tap group according to the present invention.
Figure 9:
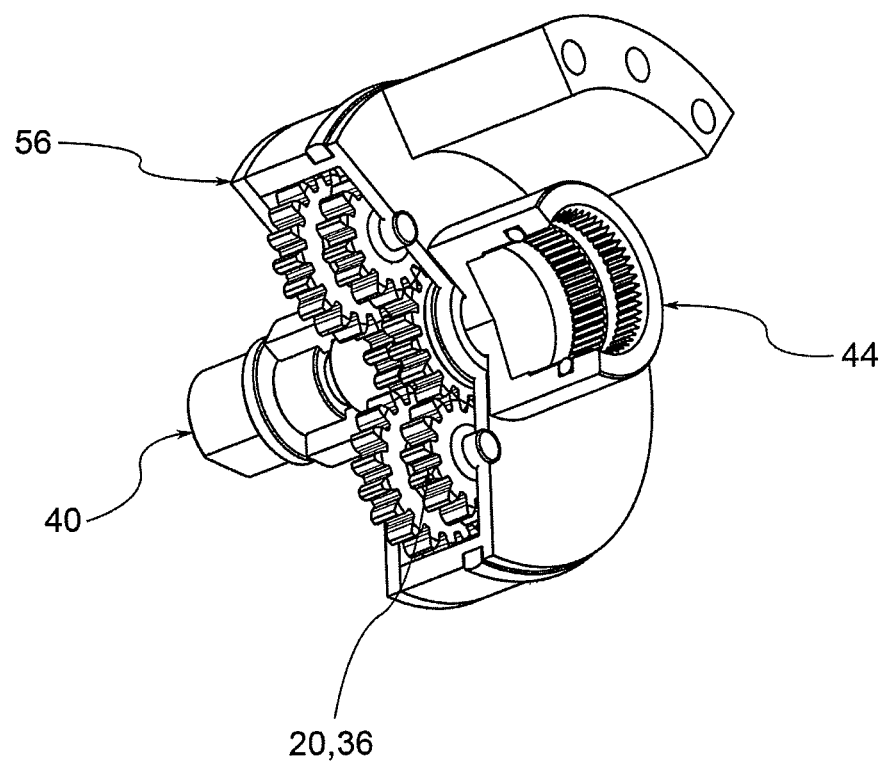

According to a possible embodiment (FIGS. 1b, 2b), the ring-nut 24 is a body provided with at least one reference index 32 of the parameters of the flow to be dispensed, and the corresponding indicators 28 of the flow parameters are placed on the tap body 8.

As mentioned above, the transmission means 20 create a gear ratio between the operating knob or lever 12 and the control rod 52 of the regulation member 16 of the flow of water. Such gear ratio may be accomplished by means of various types of transmission means, comprising gears but also pulleys, drive belts and the like.

According to an embodiment, the transmission means 20 comprise planetary type gears.

In particular, the transmission means 20 may comprise a speed reducing gear 36, attached to the operating lever or knob 12 at an entrance pinion 40, gear 36 reducing the movement of the operating lever or knob 12 on an exit pinion 44, said exit pinion 44 being engaged on a socket 48 integral with ring-nut 24.

The coupling between the operating knob or lever 12 and the entrance pinion may be a shape coupling in order to ensure the integral rotation between the connected parts; for example, such a coupling may be of the grooved shaft type.

Socket 48 of the ring-nut 24 is in turn fitted and integrally coupled in rotation to the control rod 52 of the regulation member 16, so that the transmission of the movement to the control rod 52 takes place by means of socket 48 of the ring-nut 24. Also this coupling may be, for example, of the grooved shaft type.

Preferably, the speed reducing gear 36 is accommodated inside a box 56 so as to be protected from water infiltrations.

As mentioned above, the tap body 8 may have any shape and size.

In particular, according to a possible embodiment that is ergonomic and elegant, the tap body 8, the operating knob 12 and the ring-nut 24 are bodies globally cylindrical and coaxial to each other in relation to a same main extension axis X-X.

According to an embodiment, the tap body 8, the operating knob 12 and the ring-nut 24 are cylindrical bodies all having the same outer diameter.

In such a configuration, wherein the operating knob or lever 12, the transmission means 20, the ring-nut 24 are aligned along the main extension axis X-X, a fixing bush 58 of the speed reducing gear 36, for example provided with a relevant fixing screw 59, is inserted for example between the ring-nut 24 and the regulation member 16 so that all components of the tap group 4 are internally fixed pack-wise.

According to a possible embodiment, the operating knob or lever 12 is a cylindrical body provided with a lock/release button 60 of the position of the operating knob or lever 12 in a predetermined regulation of a flow parameter; in other words, the lock/release button serves to fix a preferred regulation of the flow parameter, such as a predetermined temperature and/or flow rate value. In this way, the user can reset at least one parameter of the flow to be dispensed. For example, the typical but not exclusive use of the lock/release button consists in presetting a temperature value in order to prevent possible burns.

The lock/release button 60 is preferably provided with one or more return springs 61 so that as a result of its release by the user, for example, it can return to the rest position. The lock/release button 60 is for example provided with a hook 62 adapted to engage on a locking ring-nut 63 so as to carry out the locking function of the button itself.

According to an embodiment, said lock/release button is arranged on a base 64 of the cylindrical body, perpendicular to a lateral gripping surface 68 of the operating knob or lever 12.

Preferably, the lock/release button 60 can be operated by pressure and an at least partial rearward movement inside the volume defined by said lateral gripping surface 68 of the operating lever or knob 12. In other words, the lock and release function is carried out by at least partially pushing the same button 60: in this way, accidental pressure of the same is prevented during the gripping and movement of the operating knob or lever 12.

It is also possible to arrange the lock/release button 60 outside of the volume delimited by said lateral gripping surface 68 so that the button never falls within the volume itself, not even as a result of its actuation.

The operation and thus the regulation of a tap group according to the present invention shall now be described In particular, the user grips the operating knob or lever and rotates it so as to choose the desired parameters of flow of water; the rotation of the operating knob or lever corresponds to a rotation of the control rod 52 of the flow regulation member, according to the gear ratio imposed by the transmission means.

Simultaneously, the ring-nut 24 rotates separately from the operating lever or knob 12 and integral with the control rod 52 of the flow regulation member so as to show, in real time, the change of the dispensing parameters imposed by the user through the operating lever or knob.

It should be noted that when we say that the ring-nut 24 rotates separately from the operating lever or knob 12 it is meant that the two rotations are related to each other, that is, interconnected by the transmission means, according to the specific gear ratio expected; thus, the two rotations are different and separated from each other but always and in any case constrained by the transmission ratio imposed by the transmission means 20.

The movement of the ring-nut 24 is not in any way hindered by the user's hand, since the ring-nut is mechanically separated from the control lever and can rotate relative thereto.

Furthermore, there is not the risk that the user, by gripping the operating lever or knob, can cover at least partially the ring-nut and the parameters of the flow displayed thereby.

The rotation of the ring-nut with respect to that of the knob set by the user captures the user's attention who can verify in real time that the transmission between the control knob and the control rod 52 of the regulation member 16 of the parameters of the flow is not directed. Additionally, the user has no way to verify that, due to the gear ratio set by the transmission means, the rotation of the ring-nut and thus the regulation of the parameters of the flow is slower, and therefore more precise, compared to the rotation of the control knob; this allows having a more precise regulation of the flow parameters and also having a feedback, i.e. a direct perception of such a greater precision.

As regards the operation of the lock/release button, it should be noted that an accidental pressure thereof is impossible since the same is not arranged on the outer lateral wall of the control knob, and thus it cannot be accidentally pressed during the gripping and the movement of the knob itself.

The operation of the lock/release button preferably takes place by pressing the same arranged, for example, on the basis of the knob, preferably in a recessed position. In this way, an accidental pressure and a consequent displacement of the reference value of the flow regulation parameter is not possible.

For example, if a thermostatic cartridge is used, such a lock/release button can regulate a reference temperature value, normally set to 38 degrees. An accidental displacement of a predetermined or threshold value could lead to an accidental burn.

The same applies if the lock/release button is used to set a reference flow value, in order for example to prevent exceeding a threshold value that is usually set in order to have a water saving. Moreover, any sudden exceeding of the flow threshold value could lead to the spreading of water in the environment adjacent to the tap group. Also this possibility is prevented thanks to the specific safe positioning of the lock/release button.

As can be understood from the description, the tap group according to the invention allows overcoming the drawbacks of the prior art.

In particular, the tap group always allows the user to verify in real time the flow parameter values set by operating the operating knob or lever.

In fact, on the one hand there is never a risk that the user can accidentally cover with his/her hand the ring-nut with the parameter indicators.

Moreover, the ring-nut moves relative to the operating knob or lever: in this way, the user pays more attention to the regulation that he/she is making since the direct rotation of the operating knob or lever involves a rotation of the control rod of a different device, which is the ring-nut, at a different speed because of the interposed transmission means.

Moreover, thanks to the transmission means that prevent the direct transmission, it is possible to increase the regulation sensitivity; to this purpose, the synergy that is created between the different rotation of the control rod of the flow parameters regulation member, imposed by the transmission means, and the fact that such a different rotation is always visible, in time real, by the user, via the ring-nut, should be noted.

In other words, for the purposes of the increased regulation sensitivity, and thus to prevent the risk of wrong or too sudden regulations, it is not sufficient to reduce the transmission ratio between the operating lever/knob and the regulation member, but it is necessary that such a rotation/operation difference is always visible to the user's eye in real-time.

This is made possible by the fact that the ring-nut provided with indicators of flow parameters is in turn movable, i.e. rotatable, with respect to the operating knob or lever.

A man skilled in the art may make several changes and adjustments to the tap groups described above in order to meet specific and incidental needs, all falling within the scope of protection defined in the following claims.

We claim:

1. Tap group comprising:
   a tap body provided with at least one dispensing exit,
   an operating lever or knob, wherein the operating lever or knob is a body fitted with a lock/release button of the position of the operating lever or knob in a predefined regulation of a flow parameter, said lock/release button being positioned on a base of the body of the operating lever or knob, perpendicular to a lateral gripping surface of said knob,
   a regulation member for regulating flow parameters of water dispensed from the dispensing exit of the tap body, said parameters comprising the temperature and/or the flow of water and/or the direction of the flow of water,
   transmission means which operatively connect the operating lever or knob to said regulation member of the flow of water,
   wherein the transmission means create a gear ratio between the operating lever or knob and a control rod of the regulation member of the flow of water, so as to reduce the rotation of the control rod of the regulation member for the same rotation of the operating lever or knob,
   wherein the group comprises a ring-nut provided with at least one indicator and/or a reference index of the parameters of the flow to be dispensed, the ring-nut being separate from the operating lever or knob, being placed on the group so as to be visible to the user, and being integral with the control rod of the regulation member so as to visualize in real time the modification of the flow parameters set by the user following operation of the operating lever or knob.

2. Tap group according to claim 1, wherein the regulation member comprises a mixer cartridge.

3. Tap group according to claim 2, wherein said mixer cartridge is a thermostatic type cartridge.

4. Tap group according to claim 1, wherein the regulation member comprises a flow rate regulator.

5. Tap group according to claim 1, wherein the regulation member comprises a flow deviator for changing the direction of the flow of the dispensed water.

6. Tap group according to claim 1, wherein the ring-nut is a body provided with indicators of the parameters of the flow to be dispensed, and a corresponding reference index for said parameters is placed on the tap body.

7. Tap group according to claim 1, wherein the ring-nut is a body provided with at least one reference index of the parameters of the flow to be dispensed, and the corresponding indicators of the flow parameters are placed on the tap body.

8. Tap group according to claim 1, wherein the transmission means comprise planetary type gears.

9. Tap group according to claim 1, wherein the transmission means comprise speed reducing gears, attached to the operating lever or knob at an entrance pinion, the speed reducing gears reducing the movement of the operating lever or knob on an exit pinion, said exit pinion being engaged on a socket integral with said ring-nut.

10. Tap group according to claim 9, wherein the socket of the ring-nut is in turn fitted and integrally coupled in rotation to the control rod of the regulation member, so that the transmission of the movement to the control rod takes place by means of the socket of the ring-nut.

11. Tap group according to claim 9, wherein the speed reducing gears are housed inside a box so as to be protected from infiltrations of water.

12. Tap group according to claim 1, wherein said lock/release button can be operated by pressure and an at least partial rearward movement inside said inner volume defined by said lateral gripping surface of the operating lever or knob.

13. Tap group according to claim 1, wherein the tap body, the operating lever or knob and the ring-nut are bodies globally cylindrical and coaxial to each other in relation to a same main extension axis.

14. Tap group according to claim 1, wherein the tap body, the operating lever or knob and the ring-nut are cylindrical bodies all having the same outer diameter.

* * * * *